United States Patent [19]

Duval et al.

[11] Patent Number: 5,350,592
[45] Date of Patent: Sep. 27, 1994

[54] METHOD OF STABILIZING VEGETABLE PRODUCTS IN A RETORT-PROCESSED CHEESE AND VEGETABLE PRODUCT

[75] Inventors: David F. Duval, Arlington, Tex.; Kim C. Kruhmar, Moorpark, Calif.; Charles E. Ratcliff, Bedford, Tex.

[73] Assignee: Recot, Inc., Plano, Tex.

[21] Appl. No.: 56,770

[22] Filed: May 5, 1993

Related U.S. Application Data

[63] Continuation of Ser. No. 940,739, Sep. 8, 1992, abandoned, which is a continuation of Ser. No. 691,484, Apr. 25, 1991, abandoned.

[51] Int. Cl.$^5$ .................. A23C 19/09; A23C 19/10
[52] U.S. Cl. .................. 426/582; 426/407; 426/409; 426/521; 426/578; 426/589; 426/615; 426/626; 426/627
[58] Field of Search ............ 426/582, 521, 626, 627, 426/578, 589, 407, 409, 615

[56] References Cited

U.S. PATENT DOCUMENTS

| | | | |
|---|---|---|---|
| 1,186,524 | 6/1916 | Kraft | 426/582 |
| 1,374,141 | 4/1921 | Eldredge | 426/582 |
| 1,936,872 | 11/1933 | Frederiksen | 99/11 |
| 4,568,555 | 2/1986 | Spanier | 426/582 |
| 4,832,969 | 5/1989 | Lioutas | 426/615 |
| 4,840,806 | 6/1989 | Hyldon et al. | 426/270 |

OTHER PUBLICATIONS

"Evaluation of Factors Involved in Antibotulinal Properties of Pasteurized Process Cheese Spreads," Journal of Food Protection 49 (7), pp. 526–531 (Jul. 1986) by Tanaka et al.

*Primary Examiner*—Helen Pratt
*Attorney, Agent, or Firm*—Rothwell, Figg, Ernst & Kurz

[57] ABSTRACT

A method of preparing a stable cheese and vegetable-containing product includes contacting relatively acidic (e.g. canned, drummed or jarred) vegetables with a buffer solution to equilibrate the vegetable matter at a pH which is compatible with the dairy proteins present in the cheese. The cheese base preferably has low total solids, low cheese and low reducing sugar contents, and thus can successfully be packaged and preserved via the retort process.

19 Claims, No Drawings

METHOD OF STABILIZING VEGETABLE PRODUCTS IN A RETORT-PROCESSED CHEESE AND VEGETABLE PRODUCT

This is a continuation of application Ser. No. 07/940,739 now abandoned, filed Sep. 8, 1992, which is a continuation of application Ser. No. 07/691,484, now abandoned filed Apr. 25, 1991.

BACKGROUND OF THE INVENTION

1. Field of the Invention

The present invention relates to cheese base products, also known as cheese spreads and cheese dips, which contain vegetable matter. More particularly, the present invention provides a method for stabilizing a cheese base which contains vegetable matter, by buffering the vegetable matter prior its incorporation into the cheese base.

2. Description of the Background Art

Packaged, shelf-stable vegetables (such as canned and jarred vegetables) are acidified during the packaging process to increase their stability and shelf life. Unfortunately, the relatively low pH of such packaged vegetables renders them incompatible with heat-processed cheese based compositions (for example cheese dips) based on dairy protein emulsions. The high acidity of the vegetable matter causes the dairy emulsions to break down due to the acid-induced precipitation of one or more of the dairy proteins. The dairy proteins particularly problematic in this context include casein, lactalbumin and lactoglobulin. The isoelectric point of casein is about 4.6, while the isoelectric point of lactalbumin is 5.1 and of lactoglobulin is 5.3. Thus, the addition of vegetable matter having a pH of less than about 5.3 can cause dairy protein to precipitate out of heat-processed low solids cheese bases. This is unfortunate, as the high-acid canned vegetables represent a low-cost source of vegetable material. Because high acid content has previously rendered the low-cost canned vegetables unsuitable for use in the cheese-based products described herein, it has in the past been necessary to use higher-cost fresh vegetables for incorporation into the cheese based compositions.

The heat-processed cheese bases to which this invention is particularly directed contain a relatively low solids concentration (40% or less total solids) with no added gum stabilizers or binding agents such as carrageen or guar gum. These particularly preferred cheese bases are described in detail in U.S. patent application Ser. No. 08/038,075 which is a continuation of application Ser. No. 07/691,485 now abandoned, of even date herewith and incorporated by reference herein. The cheese bases are stable through a relatively prolonged retorting process, wherein relatively high heat is applied to sealed containers of the finished product. This stability to retort distinguishes these cheese bases from the pasteurized process cheese spreads (PPCS), which are not stable to the prolonged retorting process preferred for commercial packaging of glass jars. Vegetable matter, such as chopped tomatoes, jalapeno peppers and chile peppers are combined with the cheese base to produce cheese dips favored by consumers.

The process of this invention allows the pH of canned, drummed or jarred vegetables to be modified and stabilized (referred to as "equilibrated") so that the low solid, non-pasteurized cheese mixtures containing these particulates do not develop graininess, thermogelling or phase separation due to the acid induced deterioration of the emulsion.

U.S. Pat. No. 4,568,555 (Spanier; Feb. 4, 1986) describes a shelf stable cheese sauce which can contain dehydrated fruit and/or vegetable pieces, as opposed to the acid-packed vegetables employed in the present invention. There is no disclosure or suggestion of treating the vegetable matter with a buffer solution prior to the addition to the cheese base. The preparation of the cheese sauce involves preparing a starch/gum slurry, heated to 117°–210° F. To this slurry a mixture of cheese (5 to 15% by weight of cheese base), fats, water and flavorants are added. The vegetable pieces are then added to this cheese base. The sauce is filled into jars which are then capped and sterilized by retorting.

U.S. Pat. No. 4,840,806 (Hyldon et al.; Jun. 20, 1989) describes a tomato-based sauce which is stabilized by the addition of an acidic buffer followed by freezing to reduce the oxidative failure of the sauce. The buffer system used is designed to reduce and maintain the pH of the sauce to 4.2 or lower, and preferably between about 3.8 and 4.1, however.

There has remained a need in the art for a process that would allow the use of conventional, acidic, hot-packed vegetables such as canned tomatoes and peppers in the preparation of stable, retort-packaged cheese based products.

SUMMARY OF THE INVENTION

The present invention satisfies the foregoing and other needs in the art by providing a method for preparing a stable, vegetable matter-containing cheese based product suitable for retort packaging. In one aspect the present invention provides a method for producing a stable cheese-based mixture containing vegetable matter comprising contacting acidic vegetable matter with a buffered solution and allowing the vegetable matter to equilibrate with the buffer so as to provide a pH-adjusted vegetable matter having a pH of about 5.5 or higher. This pH-adjusted vegetable matter then is mixed into a cheese-containing composition. Typically the "acidic vegetable matter" will be canned, jarred or drummed vegetables, such as canned tomatoes and peppers, having a pH as packaged of much less than 5.5 at 250° C.

In preferred aspects of the present invention, such acidic vegetable matter is drained of packing liquid and then buffered to a pH of greater than about 5.5 by contacting the vegetable matter with a buffer solution. The contacting step is carried out for a period of time sufficient to allow the vegetable matter to absorb the buffer solution and thus "equilibrate" at the pH of the buffer. Multiple cycles of contacting the vegetable matter with buffer and draining may be carried out if necessary. The pH-adjusted vegetable matter is then mixed into a cheese-containing product. The product then is packaged and retorted.

DETAILED DESCRIPTION OF THE PREFERRED EMBODIMENTS

The "vegetable matter" useful for incorporation into the cheese-based products via the process of the present invention includes a wide variety of products, and is not strictly limited to vegetables. Fruits, nuts and other materials may be treated in accordance with the present invention and added in appropriate amounts to cheese base to provide a stable cheese dip type product. Examples of useful "vegetable matter" include but are not limited to whole, chopped, sliced or otherwise comminuted tomatoes, tomatillos, peppers including chili, jalapeno, bell, serrano, habanero and Anaheim peppers, onions, scallions, beans, peas, corn, broccoli, asparagus, cauliflower, carrots and potatoes. For the purposes of this invention "vegetable matter" also includes various nuts, such as peanuts, cashews, pistachios, pecans, walnuts and almonds, various fruits such as apples, blueberries, blackberries and raspberries, as well as pasta in all of its forms.

The vegetable matter, if packed in liquid, first may be drained, rinsed with warm water and then drained again to remove as much of the low-pH packing liquid as possible. Next, the vegetable matter is comminuted, if desired, to provide pieces of desired size and shape.

The vegetable matter is buffered in accordance with the present invention by contacting it with a buffer solution. Suitable buffer solutions must be edible and otherwise approved for use in foodstuffs. Examples of useful buffer solutions are solutions based on (1) mono- and dibasic sodium phosphate; (2) mono-and dibasic potassium phosphate; (3) monobasic potassium phosphate and dibasic sodium phosphate; (4) monobasic potassium or sodium phosphate and potassium or sodium hydroxide; (5) acetic acid and sodium or potassium acetate; and mixtures of the same. See, for example, *CRC Handbook of Chemistry and Physics*, 56th ed. (1975).

The components of the buffer solution are selected to produce a final buffered pH of at least about 5.5, and preferably in the range of pH 6.0 to 8.0 when measured at 250° C. The concentration of the buffer salts may be varied from 0.01 molar to 0.40 molar, preferably between about 0.02 to 0.2 molar. The specific buffer employed, as well as the most appropriate pH and concentration of the buffer salts, will be chosen in large part based on the particular vegetable matter sought to be used and pH-adjusted according to the present process. The dairy protein content of the cheese base also will influence the pH requirements for the buffered vegetable matter. Those of ordinary skill in the art will readily make such choices based upon the teachings herein and their knowledge of the pH of the starting vegetable product and the protein content of the cheese base being employed.

The pH of the vegetable matter is buffered in the desired range by contacting the vegetable matter with the buffer solution and allowing the vegetable particulates to equilibrate with the buffer system. The amount of buffer needed is determined by the starting pH of the vegetables, the concentration and quantity of the buffer solution used, and the buffering capacity of the particular buffer system chosen. Again, this choice is well within the level of skill of the ordinary scientist in this field in view of the teachings herein. Typically, the vegetable matter must remain in contact with the buffer solution for at least about 5 minutes in order for sufficient buffer to be absorbed. If desired, samples can be removed from the buffer solution every 10 minutes for pH measurement. If the desired equilibrated pH has not been attained, the vegetable matter can be strained from the buffer and contacted with fresh buffer solution for another period of time. This cycle of sampling and adding fresh buffer can be repeated as necessary. Once the desired equilibrated pH has been achieved, the vegetable matter is drained and incorporated into the cheese base or other cheese-containing product.

Cheese base preparations preferred for use in this process have a low total solids content (40% or less solids by weight), typically contain only about 5 to 25%, preferably 5 to 15% natural cheese, have a low acid content and a low reducing sugar content. The cheese base preparations are based on one or more cheeses which are characterized by a low reducing sugar content (for example in total less that 1% by weight of the reducing sugars galactose, lactose, glucose, fructose and the like). Preferred cheeses having the desired low reducing sugar content include Monterey Jack, Colby, Mozzarella, and Provolone. Although aged cheddars have the desirable low reducing sugar content, they solubilize poorly in processed cheese emulsions and thus can be difficult to formulate into acceptable products using commercially desirable processing technology.

The cheese base compositions also contain from about 4.0 to about 8.0 percent weight of at least one starch selected from modified (heat resistant) and unmodified (or lightly modified) waxy and dent corn starches, potato, rice, wheat, barley, sorghum and tapioca starches. A blend of modified and unmodified or lightly modified waxy corn starch, comprising a ratio of from 6:1 to 3:1, most preferably 4:1 of modified:unmodified starch is preferred.

The cheese base compositions further contain fats and/or oils in amounts sufficient to impart a smooth consistency, good flavor and acceptable "mouthfeel" characteristics. The compositions typically contain from about 3.0 to about 20.0 % by weight of at least one fat, of which the following are examples: partly hydrogenated soybean, corn, cottonseed, canola, sunflower, safflower, coconut, palm, palm kernel and other vegetable oils. Anhydrous milk fat, butter fat and other dairy fats also are acceptable for use in the cheese base. Other animal fats, such as lard or tallow, may be used once rendered and refined for food use.

The cheese base compositions also contain from about 3.0 to about 11.0 % by weight of at least one maltodextrin having a dextrose equivalent (DE) of 8 or lower. Suitable maltodextrins are commercially available, being derived from for example corn, wheat, rice, tapioca or potato starch which has been partially hydrolyzed by acids or enzymes. Additionally, the cheese base compositions typically contain about 1.0 to about 4.0% by weight of at least one edible alkali or alkaline earth buffer or emulsifier salt selected from but not limited to mono- and dibasic sodium phosphate, mono- and dibasic potassium phosphate, sodium and potassium tripolyphosphate, sodium hexametaphosphate and mixtures of the same; about 0.05 to about 0.20% by weight of an emulsifier selected from for example, mono and diglycerides, lecithin and mixtures thereof; about 60.0 to about 80.0% by weight of water and, optionally, color, seasoning and flavorants. Color additives commonly include FD&C #5, FD&C #6, canthantin and mixtures thereof. Seasonings commonly employed include white pepper, monosodium glutamate and table salt. Other useful seasonings will be chosen based upon the design of the product. Other examples of flavorants which can be used include enzyme modified cheddar cheese, and weak acids such as phosphoric, citric, lactic, acetic, succinic and malic acids, as well as combinations thereof.

As described above and discussed in the prior art, the major drawback found when adding high acid, heat-packed (canned) vegetables to cheese based compositions (cheese sauces) is the precipitation of one or more of the dairy proteins present in the emulsion. It was found that increasing the equilibrated pH of the vegetable matter to a point above the isoelectric points of the three major proteins present in the cheese has a major affect in preventing any precipitation or separation of the emulsion. Without this buffering treatment of the vegetables additives, a phase separation, graininess and precipitation at the bottom of the container is seen.

Unlike pasteurized process cheese spreads, which are destroyed by prolonged heat treatment (retort), the vegetable-containing cheese products produced according to the present invention are stable to retort conditions. Thus, the compositions are filled into suitable glass, metal or plastic containers while hot. The containers are sealed and then subjected to retort as known in the art.

The following Examples illustrate the present invention.

EXAMPLE 1

Phosphate Buffer Preparation

A phosphate buffer is prepared by adding 5.42 grams of disodium phosphate and 2.69 grams of monosodium phosphate per liter of warm water (120°-150° F). The solution is mixed until a clear solution is obtained. The final pH of the solution should be 7.0 plus or minus 0.5 pH units. Approximately one liter of the buffer solution are required to treat one kilogram of rinsed and drained chopped vegetables.

EXAMPLE 2

Preparation of Buffered Tomatoes and Peppers

The packing solution is drained from canned comminuted tomatoes, jalapeno peppers and chili peppers. The vegetables are rinsed with a soft warm (100°-120° F.) water spray while using gentle agitation. The vegetables are drained of the rinse water and added to an appropriate volume of buffer solution. The vegetables are contacted by and soaked in the buffer solution for at least 10 minutes. Samples are periodically removed, and the pH of a blended sample is measured at room temperature. If the pH is between about 5.5 and 7.0, the equilibration is complete. If the pH is still below this range, the vegetables are added to a fresh volume of buffer and the soaking process is repeated until the pH reaches the required range. Once the required pH has been obtained, the vegetables again are rinsed with water and thoroughly drained.

Vegetable Cheese Mixture

The vegetables treated in the above manner are gently stirred into hot cheese base which is held at a temperature of 130°-190° F. When even mixing has been obtained, the finished sauce is pumped into a filler which dispenses the sauce into glass jars which are then sealed and retorted.

Although the invention has been described in connection with certain preferred embodiments and specific examples, it is not so limited. Modifications and variations within the scope of the appended claims will be readily apparent to those of ordinary skill in this field.

What is claimed is:

1. A method for producing a stable cheese-based mixture containing vegetable matter comprising:
   (a) contacting acidic vegetable matter with a buffer solution and allowing the vegetable matter to equilibrate with the buffer so as to provide a pH-adjusted vegetable matter having a pH of about 5.5 or higher;
   (b) mixing the pH-adjusted vegetable matter with a retort-stable low cheese content, low acid cheese base composition comprising about 5.0% to about 25% by weight of natural cheese, the remainder of the cheese base composition comprising starch, fat and water, said cheese base composition comprising less than about 1% by weight of reducing sugar and less than 40% by weight of total solids and being formulated without added gums, whereby said cheese base composition, when packaged in sealed glass jars, is stable to retort heating at a temperature about 250° F.; and (c) heat sterilizing the mixture of cheese base composition and pH-adjusted vegetable matter.

2. The method of claim 1, wherein the contacting step is carried out at a buffer temperature between room temperature and about 180° F.

3. The method of claim 1, wherein the vegetable matter is in contact with the buffer solution for at least five minutes.

4. The method of claim 1, wherein the pH-adjusted vegetable matter is rinsed with water.

5. The method of claim 1, wherein a blended sample of the pH-adjusted vegetable matter has a pH of about 5.5 to 7.0.

6. The method of claim 1, wherein the contacting step is repeated with a fresh buffer solution if the vegetable matter has a measured pH lower than about 5.5 after equilibration with the buffer, and the contacting step is repeated until the pH-adjusted vegetable matter has a pH of about 5.5 or higher.

7. The method of claim 1, wherein said cheese base composition is at a temperature of from 130°-190° F. when mixed with the pH-adjusted vegetable matter.

8. The method of claim 1, wherein said heat sterilizing step comprises retorting the mixture in a sealed container.

9. The method of claim 1, wherein the vegetable matter comprises a mixture of tomatoes and peppers.

10. The method of claim 1, wherein the buffer solution comprises a phosphate buffer.

11. The method of claim 1, wherein the buffer is a member selected from the group consisting of (1) mono- and dibasic sodium phosphate; (2) mono- and dibasic potassium phosphate; (3) monobasic potassium phosphate and dibasic sodium phosphate; (4) monobasic potassium or sodium phosphate and potassium or sodium hydroxide; (5) acetic acid and sodium or potassium acetate; and (6) mixtures of the same.

12. The method of claim 10, wherein the buffer is a phosphate buffer comprising a solution of monobasic and dibasic sodium phosphate.

13. The method of claim 1, wherein the buffer solution is buffered at a pH of from about 5.5 to about 8.0.

14. The method of claim 1, wherein the buffer solution is buffered at a pH of from about 6.5 to about 7.5.

15. The method of claim 1, wherein the buffer solution is added to the vegetable matter and then maintained at a temperature between room temperature and 150° F.

16. The method of claim 1, wherein the buffer solution is added to the vegetable matter and maintained at a temperature between 100° and 145° F.

17. The method of claim 1, wherein the vegetable matter is equilibrated with a buffer solution for 5 to 60 minutes.

18. The method of claim 1, wherein the vegetable matter comprises particulates.

19. The method of claim 1, wherein the cheese base composition comprises about 60 to about 80% by weight of water.

* * * * *

UNITED STATES PATENT AND TRADEMARK OFFICE
CERTIFICATE OF CORRECTION

PATENT NO. : 5,350,592
DATED : September 27, 1994
INVENTOR(S) : David F. Duval et al.

It is certified that error appears in the above-indentified patent and that said Letters Patent is hereby corrected as shown below:

On the title page: Item [75]

The name of the second inventor "Kim C. Kruhmar" should be -- Kim C. Krumhar --; In the Specification: Col. 3, line 33, "250°C" should be -- 25°C --.

Signed and Sealed this

Fourteenth Day of March, 1995

Attest:

BRUCE LEHMAN

*Attesting Officer*     *Commissioner of Patents and Trademarks*